US006909512B1

(12) United States Patent
Vasudevan et al.

(10) Patent No.: US 6,909,512 B1
(45) Date of Patent: Jun. 21, 2005

(54) METHOD AND APPARATUS FOR ESTIMATING PISTON USING A GRISM

(75) Inventors: Gopal Vasudevan, San Jose, CA (US); Eric Hartel Smith, San Jose, CA (US); Robert Duncan Reardon, Mountain View, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 138 days.

(21) Appl. No.: 10/449,808

(22) Filed: May 30, 2003

(51) Int. Cl.$^7$ ................................................ G01B 9/02
(52) U.S. Cl. ...................................................... 356/521
(58) Field of Search ......................................... 356/521

(56) References Cited

U.S. PATENT DOCUMENTS

| | | | | |
|---|---|---|---|---|
| 5,080,490 A | * | 1/1992 | Manhart | 356/492 |
| 5,291,333 A | * | 3/1994 | Mills et al. | 356/520 |
| 5,467,191 A | * | 11/1995 | Kishner | 356/521 |
| 6,649,895 B1 | * | 11/2003 | Wirth | 356/512 |

OTHER PUBLICATIONS

Perrin et al. MIDI the 10 um Interferometer of the VLT. EAS Publications Series vol. 2, 2002.*
Shi et al., DCATT *Dispersed Fringe Sensor: Modeling and Experimenting with the Transmissive Phase Plates*, Jet ProOpulsion Laboratory, California Institute of Technology, Pasadena, CA 91109, Goodard Space Flight Center, NASA, Greenbelt, MD 20771, 2000.

* cited by examiner

*Primary Examiner*—Gregory J. Toatley, Jr.
*Assistant Examiner*—Patrick Connolly
(74) *Attorney, Agent, or Firm*—McDermott Will & Emery LLP (57) ABSTRACT

A method is provided for reducing the piston of neighboring first and second surfaces illuminated by polychromatic light transmitted from an unresolved-light source such that light transmitted or reflected from the first surface is out of phase with light respectively transmitted or reflected from the second surface, and the out-of-phase light is passed through a grism that generates a fringe pattern in the far-field. According to one exemplary embodiment, the method includes Fourier transforming the fringe pattern to generate a two-dimensional (2D) power spectrum; generating the absolute value of the 2D power spectrum to form an absolute value representation; displaying the 2D the absolute value representation on a computer display; and reducing the piston to affect rotation of the absolute value representation on the computer display and approximately align a central axis of the absolute value representation with an axis that indicates approximate alignment of the first and second surfaces.

38 Claims, 10 Drawing Sheets

METHOD AND APPARATUS FOR ESTIMATING PISTON USING A GRISM

BACKGROUND OF THE INVENTION

This invention relates generally to optical systems, such as telescopes, and more specifically to a method and apparatus for estimating the average displacement between surfaces or apertures by generating a two-dimensional power spectrum of a far field fringe pattern that includes extractable information of the average displacement.

Telescopes can provide glimpses at astronomical wonders that dazzle the imagination and can even operate as windows into the past. Electromagnetic radiation collected by telescopes can provide incites into the origin and development of the solar system, the Milky Way, and even the universe. With telescopes astronomers can witness the birth of stars and their fiery deaths. Telescopes have been even been used to estimate physical constants, such as the speed of light, and have been used to prove scientific principles once held in controversy, such as the principles of general and special relativity and the even the existence of black holes. Telescope are being made larger and larger to provide images relatively farther into the past and in relatively greater detail.

As telescopes, and particularly their collecting mirrors, are made relatively larger, maintaining optical integrity has become problematic. For example, as monolithic-telescope mirrors are made relatively larger, gravitational pull, which has relatively little deleterious effect on relatively small mirrors, tends to cause relatively large monolithic mirrors to warp under their own weight. Thermal gradients, which also tend to have relatively little deleterious effect on relatively small mirrors, tend to warp relatively large monolithic mirrors such that resolving power is adversely affected. Monolithic telescope mirrors, such as the matching 8.1 meter mirrors of the Gemini North Telescope on Hawaii's Mauna Kea and the Gemini South Telescope on Chile's Cerro Pachón, continue to be made despite the known troubles with such large mirrors. One solution to reduce warping of such large mirrors is to cut a honeycomb pattern into the backs of the mirrors, thereby reducing weight. Having a reduced weight, gravity tends to adversely affect honeycombed mirrors relatively less than non-honeycombed mirrors. Another technique commonly used to limit telescope mirrors from becoming misshapen, is to refrigerate the mirrors during the day to keep the temperature of the mirrors at their expected nighttime viewing temperature. While refrigeration helps to some extent to reduce temperature gradients in mirrors, mispredicted weather can foil such schemes.

Figure 1A:
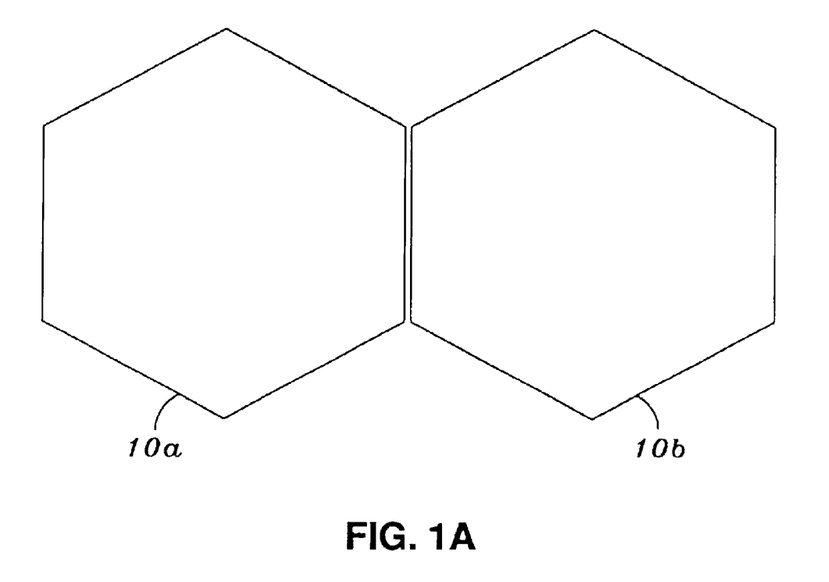
FIGS. 1A and 1B show top and cross-sectional views of a pair of hexagonal mirrors having a non-zero relative piston.
Figure 1B:
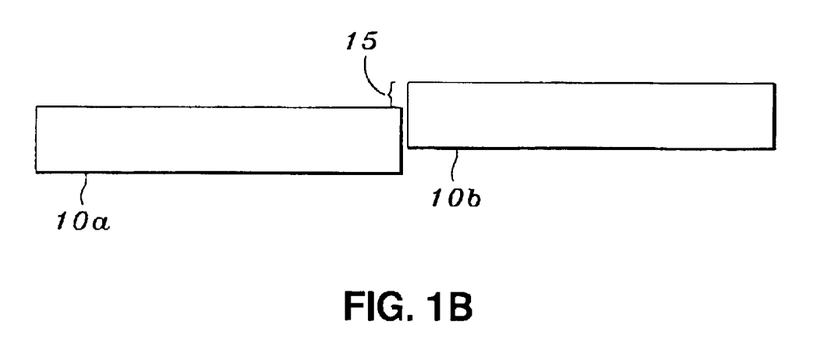

Another technique used to reduce warping of large telescope mirrors is to segment the mirrors into mirror segments that are relatively light and have manageable sizes. Two relatively large telescope mirrors that are formed from mirror segments include the matching 10 meter mirrors of the twin Keck Telescopes on Hawaii's Mauna Kea. Each Keck Telescope mirror is formed from a mosaic of 36 hexagonal mirror segments arranged in the form of a honeycomb. Each mirror segment is about 1.8 meters wide. Making the large 10 meter mirrors from mirror segments provides a mirror that is relatively light and less susceptible to flexing under its own weight. For example, each 10 meter mirror of the twin Keck Telescopes weighs about the same as the 5 meter monolithic mirror of the Hale Telescope on California's Mount Palomar. While multi-segmented mirrors have solved to some extent the weight and flex problems associated with relatively large monolithic mirrors, other problems arise. For example, the relative piston (or relative height displacement) of segmented mirrors tends to reduce the resolving power of a telescope mirror formed from the segmented mirrors. FIGS. 1A and 1B show top and cross-sectional views of a pair of hexagonal mirrors 10a and 10b having a non-zero relative piston 15. Reducing the relative piston (also commonly referred to as phasing) of the segmented mirrors is often required for causing the mirror segments to function together as a relatively high resolving optic.

Current methods of estimating the relative piston of a pair of surfaces (e.g., mirrors 10a–10b) or discontinuous apertures are both calculation intensive and their accuracy tends to be limited to approximately one wavelength in the visible spectrum. Known methods include, for example, generating a fringe pattern by reflecting a light beam off a pair of mirrors and passing the reflected light through a dispersed fringe sensor (DSP). DSPs tend to disperse the reflected light and generate a fringe pattern, which includes relative piston information of the pair of mirrors. The relative piston information is extracted from the fringe pattern by fitting line slices of the fringe pattern to a sinusoidally varying function, such as a cosine function. However, as fringe patterns generated from DSP methods do not precisely fit to a sinusoid, such methods of estimating relative piston have limited accuracy. While accuracy can be improved by further calculations, such calculations add significantly to the computing power required to improve relative piston estimates, thus driving up the costs of such schemes.

Accordingly, new methods and systems are desired for estimating the relative piston of segments (such as telescope mirror segments) and discontinuous apertures that are relatively less calculation intensive and generate relative piston data in, for example, the nanometer range. Methods and systems that can generate relative piston data in the nanometer range can in turn be used to reduce the relative piston to approximately the same range, thus improving the resolving power of optical systems having segmented optics.

BRIEF SUMMARY OF THE INVENTION

The present invention provides an optical system, such as a telescope, and more specifically provides a method and apparatus for estimating the average displacement between surfaces or apertures by generating a two-dimensional power spectrum of a far field fringe pattern that includes extractable information of the average displacement.

According to one embodiment, a method is provided for reducing displacement (or piston) of neighboring first and second surfaces illuminated by polychromatic light transmitted from an unresolved-light source, such that light transmitted or reflected from the first surface is out of phase with light respectively transmitted or reflected from the second surface, and the out-of-phase light is passed through a grism that generates a fringe pattern in the far-field. The method includes Fourier transforming the fringe pattern to generate a two-dimensional (2D) power spectrum, generating the absolute value of the 2D power spectrum to form an absolute value representation, displaying the absolute value representation on a computer display, and reducing the piston to affect rotation of the absolute value representation on the computer display and approximately align a central axis of the absolute value representation with an axis that indicates approximate alignment of the first and second surfaces. Another embodiment includes, digitizing the fringe pattern with a digitizing camera to generate a digital representation of the fringe pattern. According to another embodiment, the Fourier transform includes generating a chirp-z transform of the 2D power spectrum.

According to one embodiment, a method is provided for reducing a piston of first and second reflective surfaces. The method includes illuminating the first and second reflective surfaces with by polychromatic light transmitted from an unresolved source, transmitting light reflected from the first and second surfaces through a grism that generates a fringe pattern in the far field, digitizing the fringe pattern to form a digitized representation, Fourier transforming the digitized representation to generate a two-dimensional (2D) power spectrum, generating the absolute value of the 2D power spectrum to form an absolute value representation, displaying the absolute value representation on a computer display, and reducing the piston to affect rotation of the absolute value representation on the computer display and approximately align a central axis of the absolute value representation with an axis that indicates approximate alignment of the first and second surfaces.

According to one embodiment, a system is provided for reducing a piston of neighboring first and second surfaces illuminated by polychromatic light transmitted from an unresolved-light source, such that light transmitted or reflected from the first surface is out of phase with light respectively transmitted or reflected from the second surface, and the out-of-phase light is passed through a grism that generates a fringe pattern in the far-field. The system includes a code computer program product stored on a computer-readable storage medium including: code for Fourier transforming the fringe pattern to generate a two-dimensional (2D) power spectrum, code for generating the absolute value of the 2D power spectrum to form an absolute value representation, and code for displaying the 2D the absolute value representation on a computer display; and means for reducing the piston to affect rotation of the absolute value representation on the computer display and approximately align a central axis of the absolute value representation with an axis that indicates approximate alignment of the first and second surfaces. According to another embodiment, the system further includes a digitizing camera configured to generate a digital representation of the fringe pattern.

According to one embodiment, a method is provided for estimating relative piston between first and second surfaces illuminated by polychromatic light transmitted from an unresolved-light source such that light transmitted or reflected from the first surface is out of phase with light respectively transmitted or reflected from the second surface, and the out-of-phase light is passed through a grism that generates a fringe pattern in the far-field, the method includes: Fourier transforming the fringe pattern to generate a two-dimensional (2D) power spectrum, generating the absolute value of the 2D power spectrum to form an absolute value representation, and displaying the 2D the absolute value representation on a computer display. An angular displacement between a central axis of the absolute value representation and a fixed axis indicates the relative piston of the first and second surfaces.

Numerous benefits may be achieved using the present invention over conventional techniques. For example, the invention provides piston phasing equal to or less than about one wavelength of light in the visible spectrum. In other embodiments, the invention provides piston phasing in micron and/or nanometers ranges. In other embodiments, the invention provides relatively fast computer extraction of piston information for mirrored segments of a segmented telescope mirror. In other embodiments, the invention provides relatively improved image formation by telescopes having segmented telescope mirrors. Depending upon the specific embodiment, there can be one or more of these benefits. These and other benefits can be described throughout the present specification and more particularly below.

A further understanding of the nature and advantages of the present invention may be realized by reference to the remaining portions of the specification and the drawings.

DETAILED DESCRIPTION OF THE INVENTION

The present invention pertain to optical systems, such as telescopes, and more specifically pertains to a method and apparatus for estimating the average displacement between surfaces or apertures by generating a two-dimensional power spectrum of a far field fringe pattern that includes extractable information of the average displacement.

Non-zero displacement (or piston) between a pair of segments, such as the mirror segments of a segmented telescope mirror, causes reflected light from the segments to have a phase profile different from that of light incident on the segments. That is, the phase of light reflected from one of the segments is advanced or retarded with respect to the phase of light reflected from the other segment. Relative piston not only causes phase variation of reflected light, but also causes aberration (e.g., coma, stigmatism, etc.) in the reflected light. Reducing the relative piston of a set of segmented mirrors that compose a segmented telescope mirror, for example, reduces phase variation and aberration of the reflected wave front and thereby improves the resolving power of the segmented telescope mirror. Embodiments of the present invention are directed toward the above problems as well as others and will best be understood by reading the following description and claims, and by reviewing the appended drawings.

Embodiments of the invention are best described by first discussing an example optical system that has a pair of segments having a non-zero relative piston and the use of a dispersed fringe sensor, such as a grism, that is configured to generate a far-field fringe pattern, which inherently carries relative piston information. Second, a computerized method is discussed that is useful to extract the relative piston information from the fringe pattern. Various devices are then discussed that are configured to use the extracted relative piston to actively reduce the relative piston and hence improve the optical characteristics of the segment pair. In the example embodiments discussed below, relative piston of a pair of reflecting segments (e.g., mirrors) is discussed to illustrate systems and techniques of the invention, however it should be understood that embodiments of the present invention are not limited to the following examples. Those of skill in the art will no doubt recognize alternate embodiments, substitutes and equivalents, which are intended to be within the purview of the present invention. For example, while the following illustrative example describes generating the relative piston for a pair of reflecting segments, embodiments of the invention are useful to generate relative piston of pairs of transmissive segments or discontinuous apertures.

Figure 2:
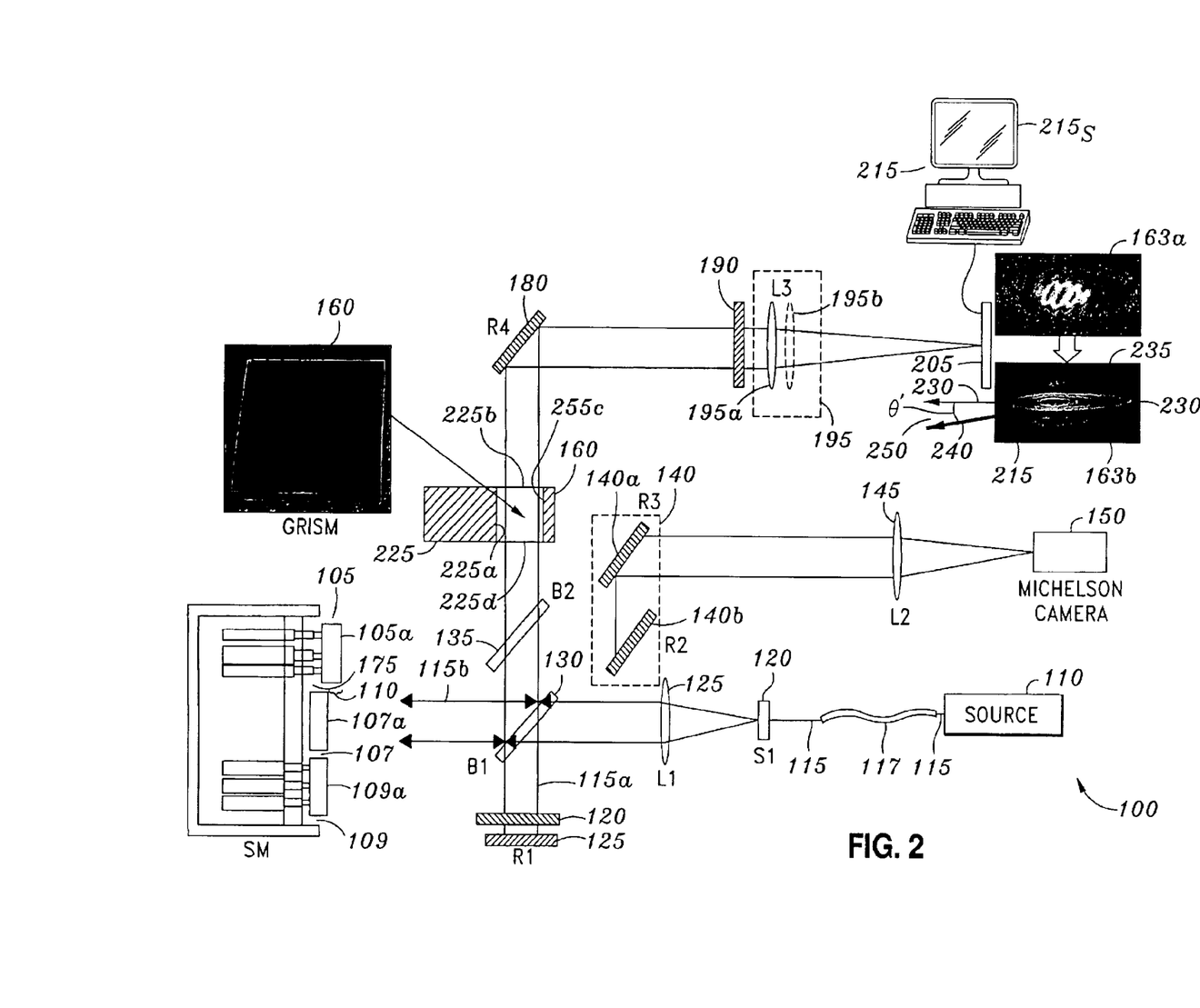
FIG. 2 is a simplified schematic of an optical system having a set of mirror segments having non-zero relative piston according to an embodiment of the present invention.

FIG. 2 is a simplified schematic of an optical system 100 according to an embodiment of the present invention. For convenience, elements of optical system 100 will be introduced to the description as the elements become relevant to the discussion. Optical system 100 includes a set of mirrors (i.e., reflecting segments) 105, 107, and 109, which are shown in profile and have mirror surfaces 105a, 107a, and 109a, respectively. While mirror surfaces 105a, 107a, and 109a are shown as being relatively flat, the mirror surfaces may be curved to form an overall reflecting surface having a complex reflecting shape, such as a parabolic mirror shape or a Schmidt mirror shape. Mirrors 105, 107, and 109 may be the segmented mirror sections of a segmented telescope mirror or other optical device. For example, mirrors 105, 107, and 109, may be the mirror segments of the Keck Telescopes' segmented primary mirrors.

According to one embodiment, mirrors 105, 107, and 109 are illuminated by a radiation source 110. Radiation source 110 may be a polychromatic source that generates a polychromatic beam of light 115. Radiation source 110 may be coupled to a fiber optic cable 117 that is configured to direct beam 115 and approximates a point source that is unresolved. That is, beam 115 upon exiting fiber optic cable 117 does not have any discernable features, such as imageable edges, imageable information of source 110 (e.g., a filament), or the like. An unresolved-point source is of use to approximate the light of star or other cosmic object collected, for example, by a segmented telescope mirror.

A filter 120 is configured to transmit and filter beam 115. According to one embodiment, filter 120 is a band-pass filter that transmits light having a bandwidth of about 200 nm. For example, band-bass filter may transmit light in about the 550 nanometer–750 nanometer range. Beam 115, after passing through filter 120, may subsequently be expanded, for example, by an expanding element 125 that may include one or more expanding lenses or expanding mirrors (e.g., parabolic mirrors). In the particular embodiment shown, expanding element 125 includes a single expanding lens. The expanded beam is passed through a beam splitter 130, which divides the beam into a pair of beams 115a and 115b. Beam 115a is shown as traveling downward and beams 115b is shown as traveling to the right toward mirrors 105 and 107. Downward traveling beam 115a is filtered by a filter 120, which may be a band-pass filter, high-pass filter, or low-pass filter as is desired. According to one embodiment, filter 120 is a high pass filter and transmits the relatively shorter wavelengths of beam 115a, such as the green spectral bands. After being filtered, beam 115a is reflected upward by a reflector 125. Beam 115a is again split by beam splitter 130. The reflected portion is not significant and is not discussed in detail. The transmitted portion of beam 115a is passed through another-beam splitter 135, which divides the beam again. The transmitted portion of beam 115a is not significant and will not be discussed in detail except to note that it is filtered from the transmitted path by a filter 135. The portion of beam 115a reflected by beam splitter 135 is directed by a steering mechanism 140, shown in FIG. 2 as a pair of reflectors 140a and 140b, through a focusing device 145 (e.g., a lens) to a Michelson Camera 150. Michelson camera 150 is used to track the relative displacement of mirrors 105 and 107 as they are adjusted to reduce relative piston 110 (piston reduction is discussed in detail below).

Referring now to beam 115b transmitted by beam splitter 130, this beam may be expanded further by a beam expander (not shown), such as a parabolic mirror or expanding lenses, or may be directed to mirrors 105 and 107 without further expansion. Beam 115b is reflected by mirrors 105 and 107, which have a relative piston 110. Upon reflection, the phase of the reflected wave front is imprinted with information of relative piston 110. Reflected beam 115b is than transmitted and reflected by beam splitter 130. The transmitted portion of beam 115b is not significant and will not be discussed in detail. The reflected portion of beam 115b is then split again by beam splitter 135. The reflected portion of the beam is directed to the Michelson camera to track the relative movement of mirrors 105 and 107.

According to one embodiment, the portion of beam 115b transmitted by beam splitter 135 is transmitted through a dispersed fringe sensor (DSP) 160 to generate a fringe pattern 163 (upper fringe pattern 163a is for a relatively high relative piston and lower fringe pattern 163b is for a relatively low relative piston.). Dispersed fringe sensor 160 is positioned in a plane where images of mirrors 105 and 107 are formed. According to one implementation, DSP 160 is a grism. A blown up image of grism 160 is shown to the left in FIG. 2. A grism is obtained by combing a grating, such as a low dispersion grating, with a beam-bending prism.

Figure 3:
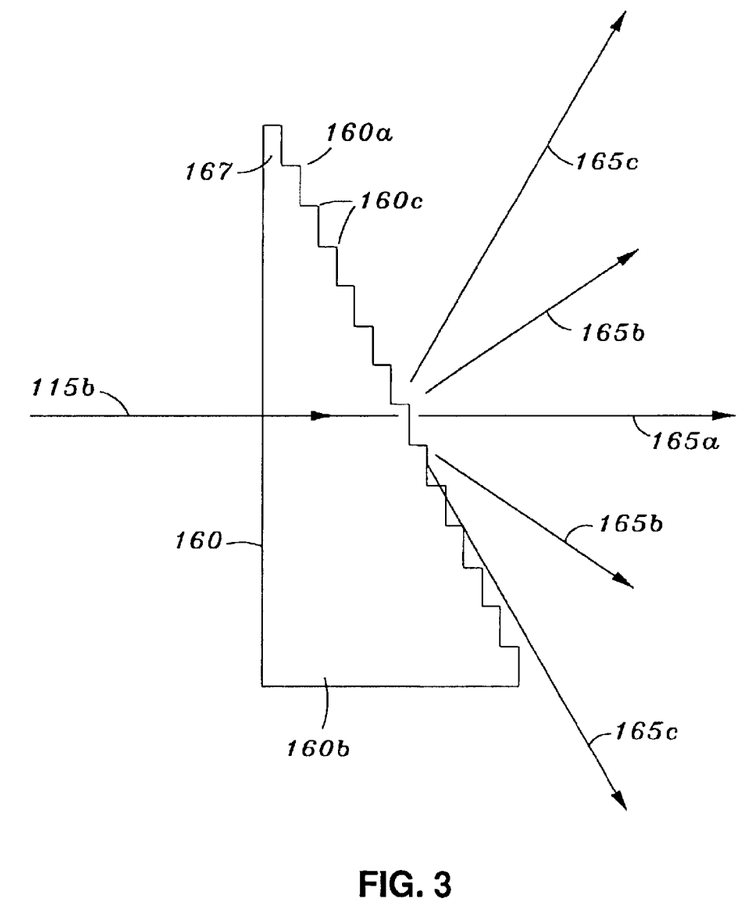
FIG. 3 is a simplified schematic of a grism according to an embodiment of the present invention.

FIG. 3 is a simplified schematic of a grism 160 according to an embodiment of the present invention. Grism 160 is a combination of a low-dispersion grating 160a (in the particular embodiment shown, low-dispersion grating 160a is a transmission grating) coupled to a prism 160b. The grism is used to disperse the wave front of beam 115b. Most of the dispersion occurs in the grating and the prism is used to steer the first spectral order 165a in a direction parallel beam 115b. The grating spacing 160c is selected to transfer the majority of beam energy into a first spectral order 165a and relatively less beam energy into higher spectral orders 165b, 165c, etc. According to one implementation, the grating spacing 165e of grism 160 is between about 60 lines per millimeter and about 80 lines per millimeter. According to a particular implementation, grating spacing 165e is about 70 lines per millimeter. According to a further implementation, the prism angle 167 is about 5° or less and in a specific implementation is about 3°. The grism's grating lines 160a are oriented approximately perpendicular to a gap 175 disposed between mirrors 105 and 107. Perpendicular orientation of grating lines 165a and gap 175 provides a reference frame to which the orientation of fringe pattern 163 can be referenced (discussed in further detail below).

Referring again to FIG. 2, according to one embodiment, subsequent to passing diffracted beam 115b through grism 160, the first spectral order 165a of beam 115b is directed by a steering device 180, through a filter 190, and then through a focusing device 195. While steering device 180 is shown as a single reflector, more reflectors may be included. Filter 190 may be a band-pass filter, high-pass filter, or low-pass filter as is desired. According to one embodiment, filter 190 is a band pass filter configured to transmit light in the relatively longer wavelengths, such as the red spectral bands. Focusing device 195, which includes a least a first lens 195a, is used to focus the first spectral order 165a onto a camera 205. According to one embodiment, camera 205 is positioned at the focal point of lens 195a. The first spectral order imaged on camera 205 is in the form of fringe pattern 163 that includes information of the relative piston 110 between mirrors 105 and 107.

Camera 205 may be a CCD (charged coupled device) camera, a CMOS (complimentary metal oxide) camera, or other digitizing type camera. Camera 205 is configured to digitize images of fringe pattern 163 and transfer digital data of the images to a computer 215.

Figure 4:
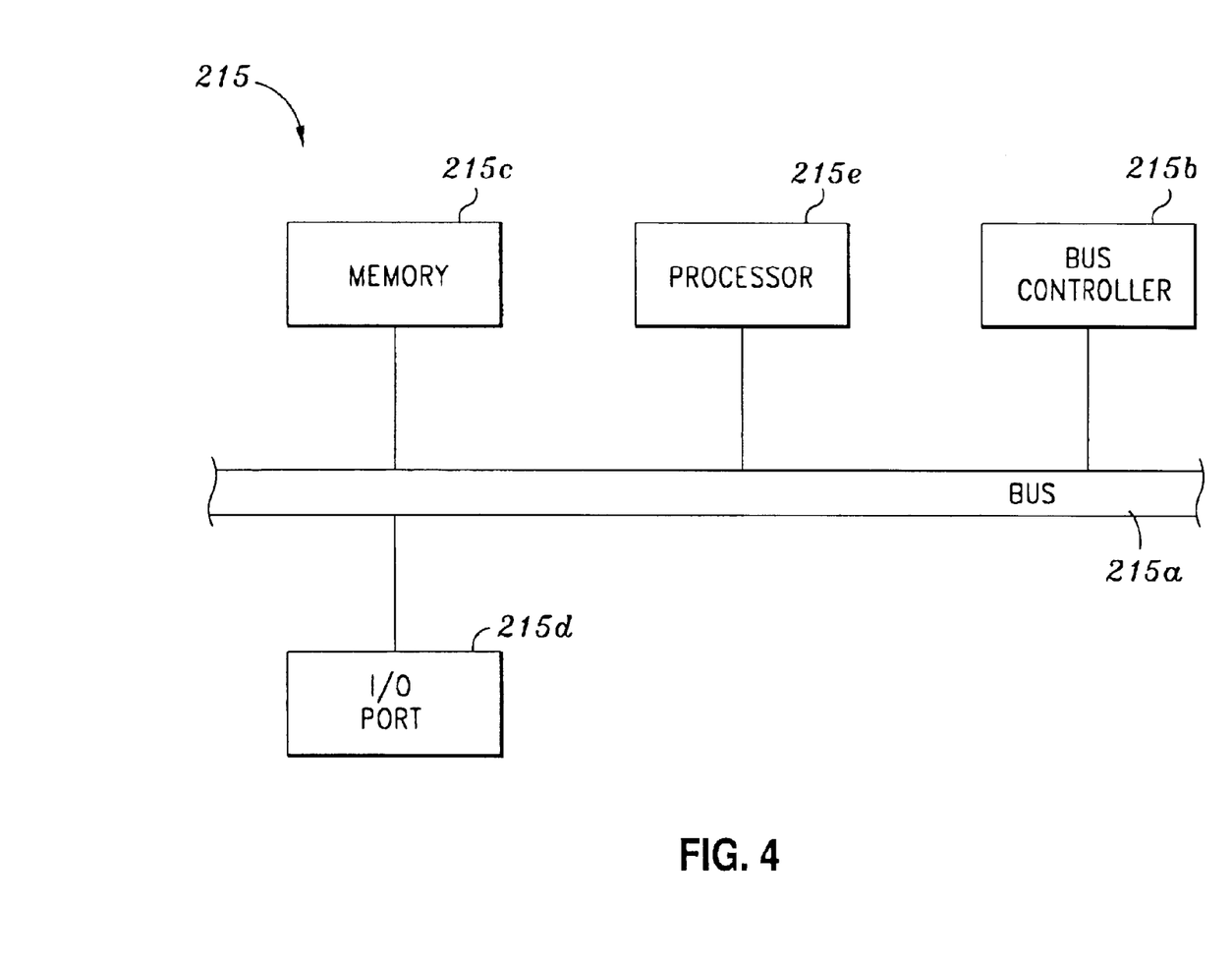
FIG. 4 is a block diagram of a computing device according to an embodiment of the present invention.

FIG. 4 is a block diagram of computer 215 according to an embodiment of the present invention. Computer 215 includes a bus 215a and bus controller 215b configured to provide a communication and control path between modules of the computer. A memory 215c is coupled to bus 215a and is configured to store digital data transferred from digital camera 205 via an I/O port 215d. Memory 215c may include, but is not limited to, one or a combination of a cache, ROM, EPROM, EEPROM, DRAM, SRAM, digital disk (e.g., a CD or CD-R), floppy disk, hard disk, and optical memory. Memory 215c may also be configured to store computer program code and to provide the digital data and computer program code to a processor 215e for processing. Processor 215e may be a microcomputer, a microprocessor, a microcontroller or the like, such as those manufactured, for example, by Intel, AMD, and Motorola. Processor 215c may be configured to execute computer program code transferred from memory 215c, computer program code received via I/O port 215d or computer code received from another source. The results of the computer program code execution may be displayed on a display 215g (see FIG. 2), may be stored in memory 215b, may be transferred to another processor for further computation, transferred from the computer via I/O port 215d, or otherwise manipulated.

Figure 5:
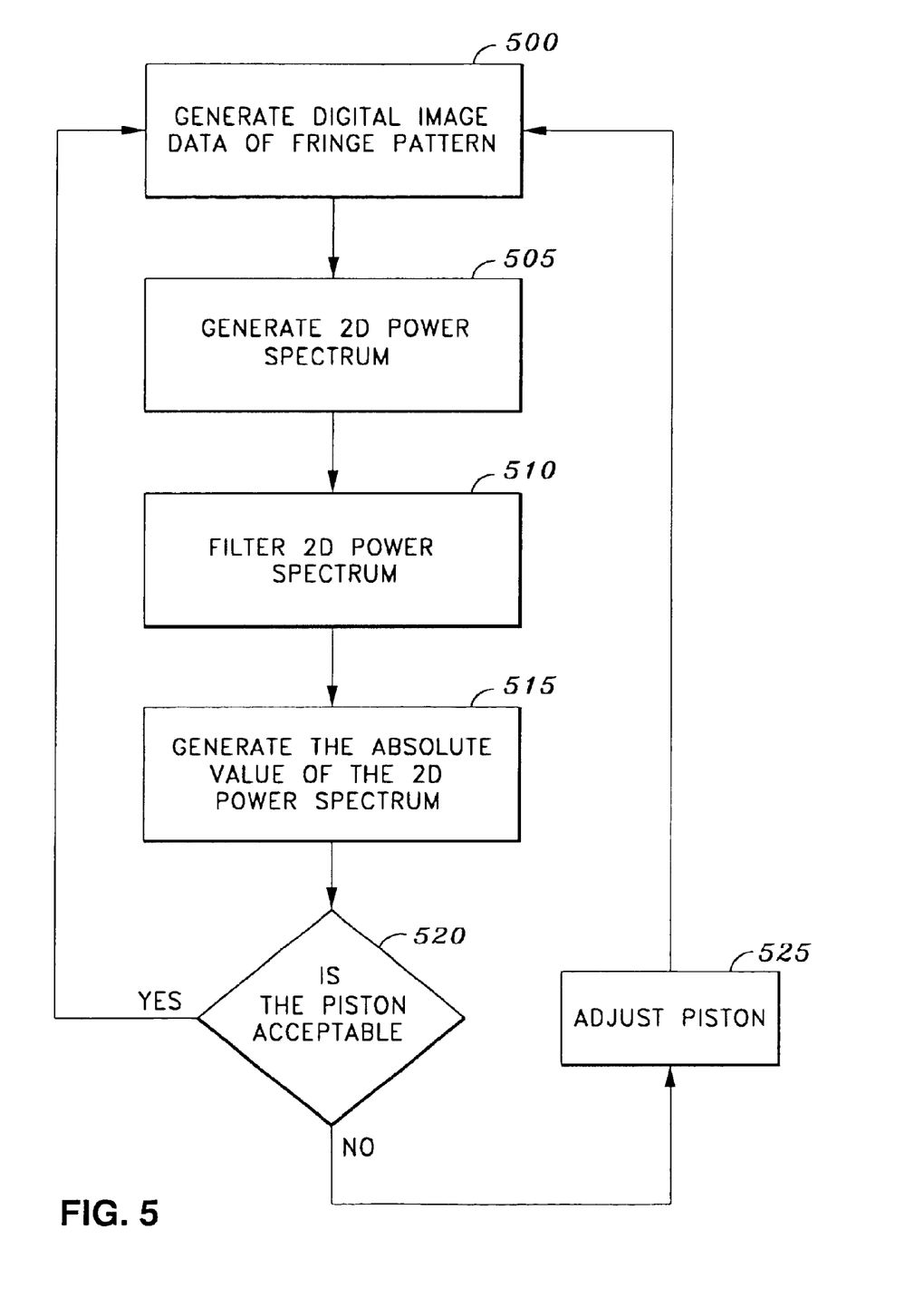
FIG. 5 is a simplified high-level flowchart having steps for a method of extracting relative piston information from a pair of segments.

FIG. 5 is a simplified high-level flowchart having steps for a method of extracting relative piston information from a pair of segments, such as mirrors 105 and 107. The method may be performed by computer 215 or other computing device. The method may be performed by software modules executed by processor 215e or by other hardware modules (not shown) coupled to processor 215e, or combinations thereof. The high-level flowchart is merely illustrative of an embodiment incorporating the present invention and does not limit the scope of the invention as recited in the claims. One of ordinary skill in the art would recognize variations, modifications, and alternatives.

Figure 6A:
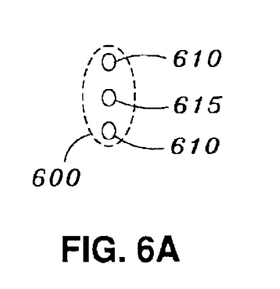
FIGS. 6A–6D show a time ordered sequence of events of the alignment of the central and fixed axes in 2D power space, such that the alignment of the axes is an indication of relative piston reduction between the mirrors.
Figure 6B:
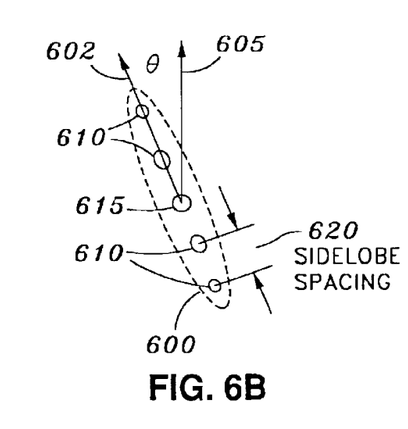
Figure 6C:
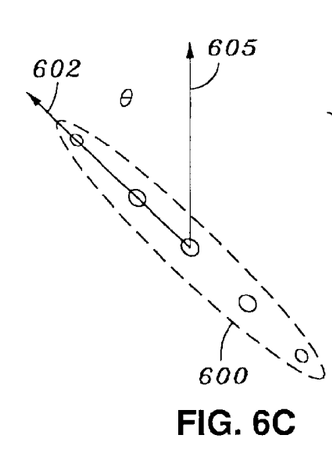
Figure 6D:
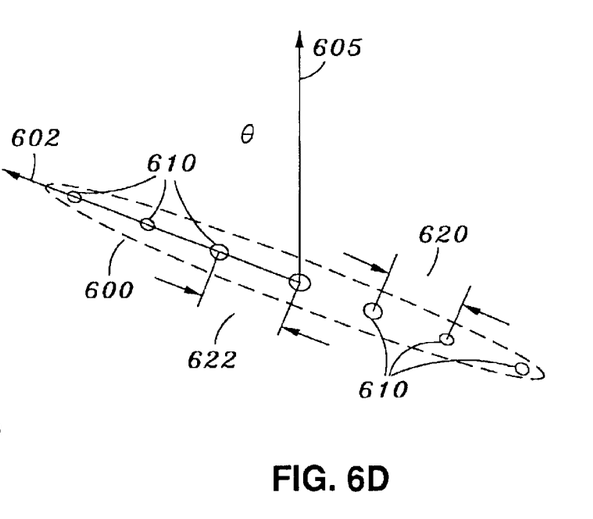

For convenience, FIG. 5 will be described in combination with FIG. 4 and FIGS. 6A–6B. As briefly discussed above, digital image data of fringe pattern 163 is generated by camera 205 and is transferred in a data stream, either continuous or intermittent, to memory 215c, step 500. Processor 215e is configured to generate a two dimensional (2D) power spectrum of the digital image data by computing the Fourier transformation of the digital image data, step 505. Fourier transforms of use include, but are not limited to, a discrete Fourier transform, a fast Fourier transform, or a chirp-z transform. Subsequent to generating the 2D power spectrum, the 2D power spectrum is filtered to remove low frequency data (approximately DC noise) and high frequency noise, step 510. High frequency noise is typically generated by system components, such as by camera 205 or other components.

Subsequently, in a step 515, the absolute value of the 2D power spectrum is generated. FIGS. 6A–6DA show graphical representations of the absolute power of a 2D power spectrum 600, which may be displayed, for example, on display 215g according to an embodiment of the present invention. The dashed lines outlining 2D power spectrum 600 are included in FIGS. 6A–6D for convenience to aid in indicating the orientation of the 2D power spectrum. In power spectrum space, the angular orientation θ of a central axis 602 of the 2D power spectrum relative to a fixed axis 605 provides both the relative piston 110 and the sign of the relative piston. That is, whether mirror 105 is relatively "higher" or "lower" than mirror 107. For example, for central axis 602 positioned to the left of fixed axis 605 (e.g., negative θ), this may indicate mirror 105 is relatively higher than mirror 107, and central axis 602 positioned to the right of fixed axis 605 (e.g., positive θ) may indicate mirror 105 is relatively lower than mirror 107. The orientation of fixed axis 605 is determined by gap 175 disposed between mirrors 105 and 107. Central axis 602 is defined by the alignment of sidelobes 610 positioned about a central lobe 615. Specifically, central axis 602 is a line projected through the centers of sidelobes 610 and central lobe 615.

The spacings 620 and 622 of the sidelobes with respect to one another and with respect to central lobe 615, respectively, also include relative piston information. Relatively wide spacings 620 and 622 indicate a relatively high relative piston and relatively narrow spacings indicate relatively low relative piston. Additionally, the relative intensity of the sidelobes increases with decreasing relative piston and decreases with increasing relative piston providing another indicator of relative piston 110.

According to one embodiment, the relative piston and sign of the relative piston extracted from the absolute power of the 2D power spectrum are monitored and used to determine whether the relative piston is acceptable or whether the relative piston is outside of an acceptable range and should be adjusted, step 520. For example, if central axis 602 and fixed axis 605 have a detectable non-zero angular separation (e.g., θ≠0), either mirror 105 or 107 may be moved "up" or "down" relative to one another to reduce relative piston 110, step 525. This process may be repeated until the relative piston is within an acceptable range. If the relative piston is within an acceptable range, monitoring may be continued to determine whether future relative piston adjustment is required. Similarly, the intensity of the sidelobes 610 may be monitored or spacings 620 and 622 may be monitored to determine whether relative piston 110 is within acceptable limits. For example, relative piston 110 may be adjusted until the sidelobe intensity of sidelobes 610 is approximately equal or until spacing 620 and 622 are lowered and are within an acceptable range. Adjusting the relative piston of mirrors 105 and 107 within an acceptable range is often referred to as "phasing."

The relative piston of mirrors 105 and 107 may be adjusted by a variety of known techniques. For example, mirror 105 may be coupled to a set of height adjusting devices 220, as shown in FIG. 2. Height adjusting devices 220 may include a variety of known devices, such as electromagnetically controlled solenoids, piezoelectrics, or the like. Height adjusting devices 220 may be adjusted by manual control or by computer control. For example, relative piston 110 may be extracted by computer 215, as discussed above, and may be passed to height adjusting devices 220 to reduce the relative piston. This process can be repeated to maintain relative piston within a given range. While mirror 105 is shown to be mounted to sets of height adjusting devices 220, mirror 107 may be similarly mounted. Therefore, either mirror 105 or 107 may be adjusted to reduce relative piston 110.

Figure 7:
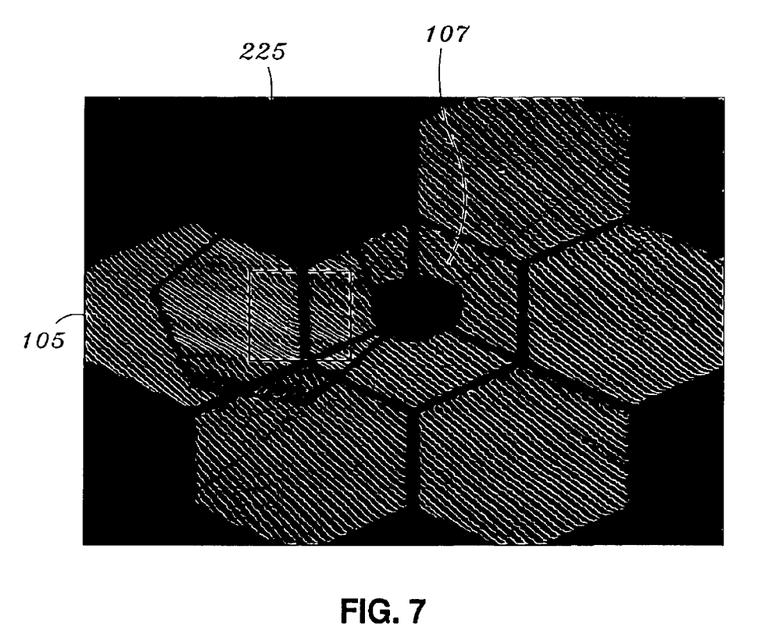
FIG. 7 shows a metrology view of a pair of mirrors and a mask imaged by a camera.

According to one embodiment, a mask 225 is disposed over grating lines 165a and at least a second lens 195b (shown in phantom) is included in focusing device 195; see FIG. 2. Lens 195b is referred to as a "pupil imaging lens" and is configured to transmit rectifiable images of mask edges 225a–225d onto camera 205. FIG. 7 shows a metrology view of mirrors 105 and 107 and mask 225 imaged onto camera 205. Projecting an image of mask 225 on camera 205 provides that the grating lines 160a (FIG. 3) of grism 160 may be relatively quickly and accurately oriented to a desired orientation, for example, perpendicularly oriented to gap 175. Accurately orienting grating lines 165a perpendicular to gap 175 affectively optimizes the accuracy of the relative piston extracted from fringe pattern 163. To orient the grating lines approximately perpendicular to gap 175, mask edges 225a and 225c are oriented approximately perpendicular to grating lines 165a and mask edges 225b and 225d are oriented approximately parallel to grating lines 165a. As the mask's edges are oriented perpendicularly and parallel to the grating lines, images of the mask edges projected on camera 205 provide image information regarding the orientation of the grating lines. For example, to optimize the perpendicular orientation of grating lines 165a and gap 175, mask edges 225a and 225c are oriented approximately parallel to gap 175 and mask edges 225b and 225d are oriented approximately perpendicular to the gap.

Figure 8A:
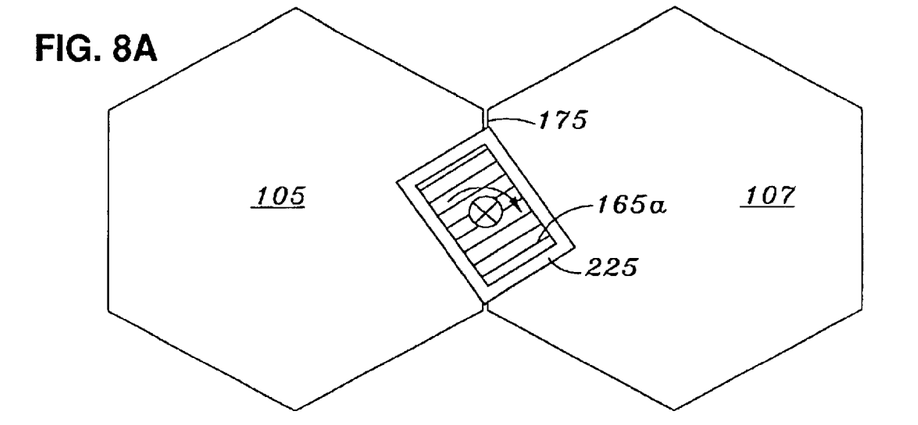
FIGS. 8A–8C show a time ordered sequence of events of orienting a set of grating lines approximately perpendicular to a gap between a pair of mirrors.
Figure 8B:
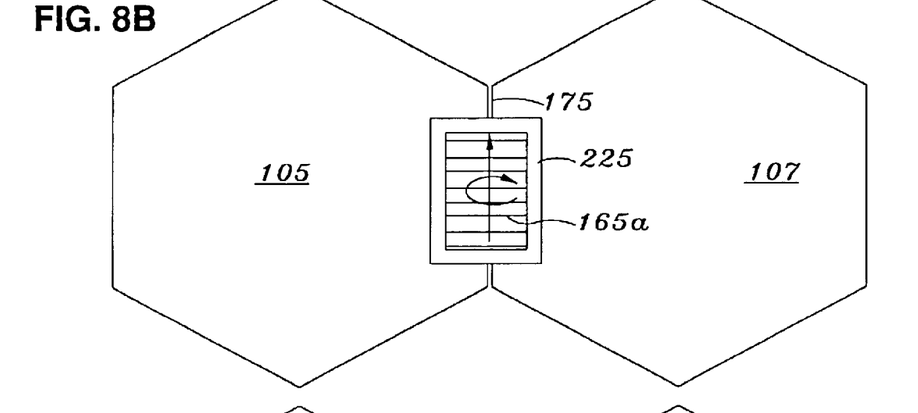
Figure 8C:
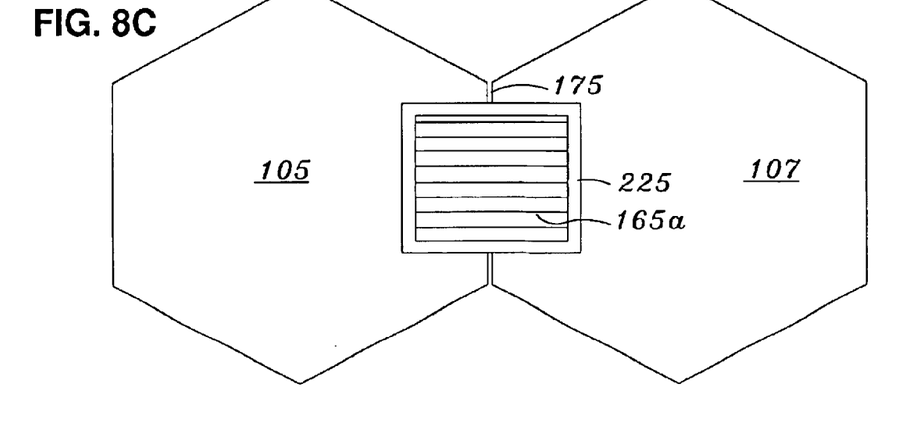

FIGS. 8A–8C show a time ordered sequence of events of orienting grating lines 165a and gap 175 approximately perpendicular. In FIG. 8A mask 225 and grating lines 165a are shown to lie skewed from a desired perpendicular orientation. To adjust the skew of grating lines 165a, grism 160 is rotated about an axis 805, shown as perpendicular to the page and is rotated about an axis 810, shown as vertically extending. As is common in the art, a circle with a cross inside "X" is used to indicate axis 805 extending into the page. Arrow 820 indicates rotation about axis 805 and arrow 825 indicates rotation about axis 810. Grating lines 165a are approximately perpendicular to gap 175 when the area of mask 225 projected onto camera 205 is approximately maximized.

Figure 9:
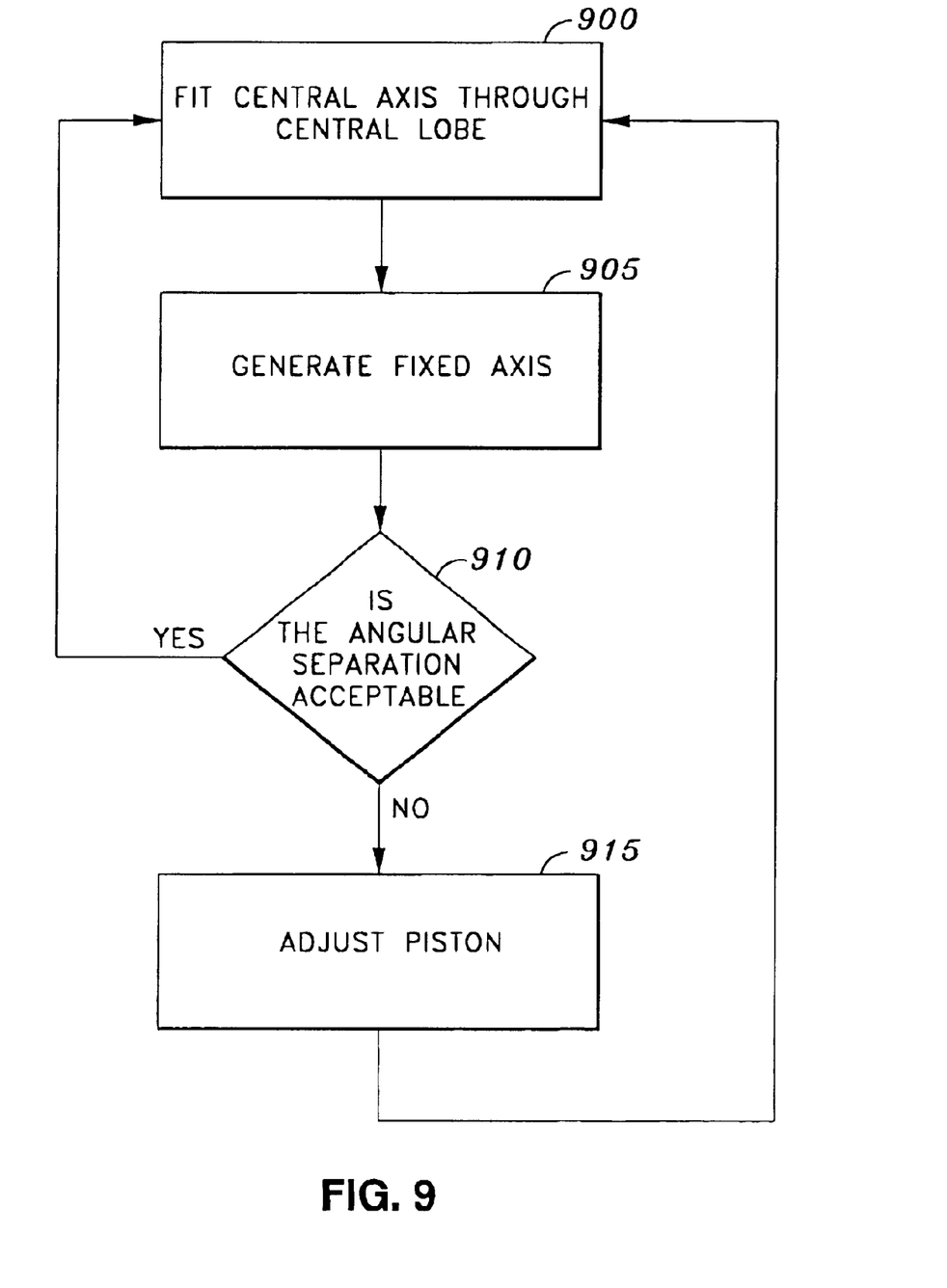
FIG. 9 is a simplified high-level flowchart having method steps for extracting relative piston from a pair of segments, such as a pair of mirrors 105 and 107.

FIG. 9 is a simplified high-level flowchart having method steps for extracting relative piston from a pair of segments, such as mirrors 105 and 107. The method may be performed by computer 315 or other computing device. The method may be performed by software modules executed by processor 215e or by other hardware modules (not shown) coupled to processor 215e, or combinations thereof. The high-level flowchart is merely illustrative of an embodiment incorporating the present invention and does not limit the scope of the invention as recited in the claims. One of ordinary skill in the art would recognize variations, modifications, and alternatives.

For convenience, FIG. 9 will be described in combination with FIG. 2. Reduction of the relative piston of mirrors 105 and 107 to less than about one or two average wavelengths of beam 115b causes the reduction of the horizontally oriented lobes of fringe pattern 163 to a single central lobe 230 and causes side lobes 235 to form vertically about the central lobe. According to one embodiment, the orientation of central lobe 230 and the relative brightness of sidelobes 235 can be used to extract relative piston 110 and can be monitored as the relative piston is adjusted to infer reduction of the relative piston. According to one embodiment, a central axis 240 is fitted along the elongated direction of central lobe 230, step 900 and a fixed axis 240 is generated from the orientation of gap 175, step 905. An angular separation 250, denoted by θ', between central axis 230 and fixed axis 240 provides information of the relative piston 110 between mirrors 105 and 107. Relatively small angular separation indicates relatively low relative piston 110 and relatively high angular separation indicates relatively large relative piston. The sign of the angular separation indicates whether mirror 105 is higher or lower than mirror 107. For example, for central axis 230 positioned below fixed axis 240 (e.g., negative θ') this may indicate mirror 105 is relatively higher than mirror 107, and for central axis 230 positioned above fixed axis 240 (e.g., positive θ') this may indicate mirror 105 is relatively lower than mirror 107. The angular separation is monitored to determine whether the relative piston is within an acceptable range, step, 910. If the angular separation is unacceptably high, the height of either mirror 105 or 107 may be adjusted to reduce the relative piston, step 915. After mirror adjustment, the above steps may be repeated to monitor relative piston 110 and phase the mirrors as desired. Alternatively, if the angular separation is acceptable, no adjustment is made to relative piston 10 and the relative piston may continue to be monitored to determine if future relative piston adjustment is desired.

According to an alternate embodiment, the intensity of sidelobes 235 are monitored to determine whether the relative piston of mirrors 105 and 107 should be adjusted or left unchanged. Relatively balanced intensity of sidelobes 235 indicates relatively low relative piston (i.e., no piston adjustment may be desired) and relatively unbalanced intensity indicates relatively high relative piston (i.e., piston adjustment may be desired). Similar to the method described above for monitoring the angular separation of central axis and fixed axis, the relatively equal or relatively unequal intensity of sidelobes 235 may be monitored to determine whether relative piston 110 adjustment is desired.

Figure 10:
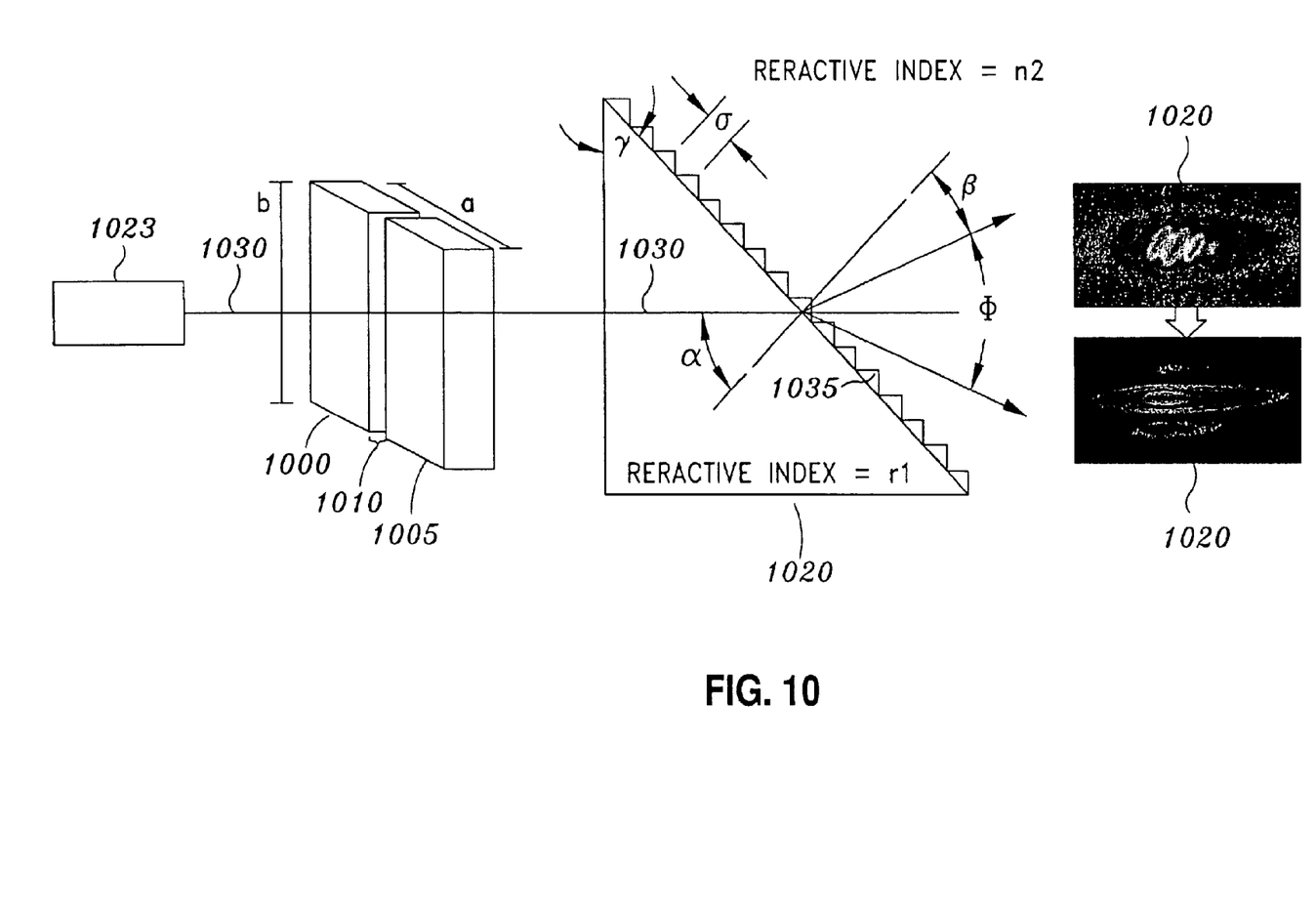
FIG. 10 is a simplified schematic of a pair of discontinuous apertures having a non-zero relative piston according to an embodiment of the present invention.

FIG. 10 is a simplified schematic of a pair of discontinuous apertures 1000 and 1005 having a relative piston 1010 according to another embodiment of the present invention. Similar to embodiments described above, a approximately non-zero relative piston 1010 causes a fringe pattern 1020 to be generated when polychromatic non-resolvable radiation 1030 generated by a radiation source 1023 is transmitted through apertures 1000 and 1005 and is further transmitted through a grism 1025. Relative piston 1010 can be modeled mathematically to provide insight into the relative piston information provided in the fringe pattern. The following is a discussion of an algebraic description of apertures 1000 and 1005 and of the relative piston 1010 of the apertures.

To simplify the discussion, the width and height of apertures 1000 and 1005 are denoted by the letters "a" and "b," respectively, and the relative piston 1010 is denoted by the letter "d." For convenience, maximum and minimum wavelengths of polychromatic beam 1030 are referred to as $\lambda$max and $\lambda$min, respectively. The algebraic description of the fringe pattern is derived by noting that grism 1025 can be described by a combination of Snell's law with the grating equation. Snell's law, as is well know in the art, can be used to describe the refraction, or bending of light, as light passes from a medium having a first index of refraction, say n1, to another medium having a second index of refraction, say n2. Snell's law is written below for interface 1035 at which beam 1030 is shown to pass from the grism (having an index of refraction n1), to another medium (having an index of refraction n2):

$$m\lambda = \sigma(n1(\lambda)\sin(\alpha) + n2(\lambda)\sin(\beta))$$

where α and β are angles of beam 1030 with respect to a surface normal and σ is the grating pitch. For a given dispersion φ equally about a center wavelength λ and with the index of refraction n2 set to 1 for convenience, the apex angle γ of grism 1025 is given as:

$$\gamma = \arctan\left(\frac{(\lambda_{min} + \lambda_{max})\sin(\theta)}{\lambda_{max}(n1(\lambda_{min} - \cos(\theta)) - \lambda_{min}(n1(\lambda_{max} - \cos(\theta))))}\right)$$

where θ=2φ. The grating spacing is given as:

$$\sigma = \left(\frac{\lambda_{min}}{n1(\lambda_{min})\sin(\gamma) - \sin(\gamma + \theta)}\right).$$

For apertures 1000 and 1005, the intensity of the far field diffraction pattern produced by grism 1025 is given as:

$$I(\xi, n1) = \int_{\lambda_{min}}^{\lambda_{max}} flux(\lambda) \left(\frac{ab}{\lambda z}\operatorname{sinc}\left(\frac{\pi a \xi}{2\lambda z}\right)\cos\left(\frac{\pi(a\xi + 2dz)}{2\lambda z}\right)\operatorname{sinc}\left(\frac{\pi b(n1 + z\tan(\theta(\lambda)))}{\lambda z}\right)\right)^2 \frac{ab}{\lambda z}$$

The first sinc term is standard for a rectangular aperture. The second sinc term contains the effect of the grating on each particular wavelength in beam 1030. The variable θ(λ) is the wavelength dependent dispersion introduced by grism 1025 and z is the far-field propagation distance of the far-fringe propagation pattern. The cosine term provides relative piston information d. ξ is a spacial distribution term for the far field diffraction pattern.

It is to be understood that the examples and embodiments described above are for illustrative purposes only and that various modifications or changes in light thereof will be suggested to persons skilled in the art and are to be included within the spirit and purview of this application and scope of the appended claims. For example, while, radiation source 110 has been described as being coupled to a fiber optic cable to approximate an unresolved light source, the polychromatic source may be that of a star or other cosmic body whose light is captured by a telescope having segmented mirrors. Therefore, the above description should not be taken as limiting the scope of the invention as defined by the claims.

What is claimed is:

1. A method for reducing a piston of neighboring first and second surfaces illuminated by polychromatic light transmitted from an unresolved-light source such that light transmitted or reflected from the first surface is out of phase with light respectively transmitted or reflected from the second surface, and the out-of-phase light is passed through a grism that generates a fringe pattern in the far-field, the method comprising;

Fourier transforming the fringe pattern to generate a two-dimensional (2D) power spectrum;

generating the absolute value of the 2D power spectrum to form an absolute value representation;

displaying the absolute value representation on a computer display; and reducing the piston to affect rotation of the absolute value representation on the computer display and approximately align a central axis of the absolute value representation with an axis that indicates approximate alignment of the first and second surfaces.

2. The method of claim 1 further comprising digitizing the fringe pattern with a digitizing camera to generate a digital representation of the fringe pattern.

3. The method of claim 2 wherein the digitizing camera is a CCD array or a CMOS array.

4. The method of claim 1 wherein the Fourier transforming step includes generating a chirp-z transform of the 2D power spectrum.

5. The method of claim 1 wherein the Fourier transforming step includes generating a discrete Fourier transform of the 2D power spectrum.

6. The method of claim 1 further comprises adjusting the piston to affect reduction of spacings between sidelobes of the absolute value representation, wherein the reduction indicates piston reduction.

7. The method of claim 1 further comprising reducing the piston to affect approximate alignment of a central lobe of the fringe pattern with a spacing between the first and second surfaces, wherein the approximate alignment of the central lobe and the spacing indicates approximate alignment of the first and second surfaces.

8. The method of claim 1 wherein reducing the piston includes reducing the piston to less than an average wavelength of the polychromatic-unresolved light.

9. The method of claim 1 wherein reducing the piston includes reducing the piston to less than 1/50th of an average wavelength of the polychromatic-unresolved light.

10. The method of claim 1 wherein reducing the piston includes reducing the piston to less than 1/100th of an average wavelength of the polychromatic-unresolved light.

11. The method of claim 1 wherein the polychromatic-unresolved light includes wavelengths between 550 nanometers and 750 nanometers.

12. The method of claim 1 further comprising reducing the piston to affect intensity balancing of sidelobes of the fringe pattern, wherein approximately intensity-balanced sidelobes indicate approximate alignment of the first and second surfaces.

13. The method of claim 1 further comprises masking the grism to form a mask.

14. The method of claim 13 further comprises imaging the mask on a digitizing camera.

15. The method of claim 14 further comprising rotating the grism to orient grating lines on the grism approximately perpendicular to a gap disposed between the first and second surfaces.

16. The method of claim 15 wherein the grating lines and the spacing are rotated to approximate perpendicularity by approximately maximizing an area of the mask projected on the digitizing camera.

17. The method of claim 1 wherein the first and second surfaces are mirrored surfaces.

18. The method of claim 1 wherein the first and second surfaces are mirrored surfaces of a multi-segment telescope mirror.

19. A method for reducing a piston of first and second reflective surfaces, the method comprising:
- illuminating the first and second reflective surfaces with by polychromatic light transmitted from an unresolved source;
- transmitting light reflected from the first and second surfaces through a grism that generates a fringe pattern in the far field;
- digitizing the fringe pattern to form a digitized representation;
- Fourier transforming the digitized representation to generate a two-dimensional (2D) power spectrum;
- generating the absolute value of the 2D power spectrum to form an absolute value representation;
- displaying the 2D the absolute value representation on a computer display; and
- reducing the piston to affect rotation of the absolute value representation on the computer display and approximately align a central axis of the absolute value representation with an axis that indicates approximate alignment of the first and second surfaces.

20. A system for reducing a piston of neighboring first and second surfaces illuminated by polychromatic light transmitted from an unresolved-light source such that light transmitted or reflected from the first surface is out of phase with light respectively transmitted or reflected from the second surface, and the out-of-phase light is passed through a grism that generates a fringe pattern in the far-field, the system comprising;
- a code computer program product stored on a computer-readable storage medium including:
  - code for Fourier transforming the fringe pattern to generate a two-dimensional (2D) power spectrum,
  - code for generating the absolute value of the 2D power spectrum to form an absolute value representation, and
  - code for displaying the 2D the absolute value representation on a computer display; and
- means for reducing the piston to affect rotation of the absolute value representation on the computer display and approximately align a central axis of the absolute value representation with an axis that indicates approximate alignment of the first and second surfaces.

21. The system of claim 20 further including a digitizing camera configured to generate a digital representation of the fringe pattern.

22. The system of claim 21 wherein the digitizing camera is a CCD array or a CMOS array.

23. The system of claim 20 wherein the code for Fourier transforming includes code for generating a chirp-z transform of the 2D power spectrum.

24. The system of claim 20 wherein the code for Fourier transforming includes code for generating a discrete Fourier transform of the 2D power spectrum.

25. The system of claim 20 wherein the means for reducing the piston is configured to affect rotation of the absolute value representation on the computer display and approximately align a central axis of the absolute value representation with an axis that indicates approximate alignment of the first and second surfaces.

26. The system of claim 20 wherein the means for reducing the piston is configured to affect approximate alignment of a central lobe of the fringe pattern with a spacing between the first and second surfaces, wherein the approximate alignment of the central lobe and spacing indicates approximate alignment of the first and second surfaces.

27. The system of claim 20 wherein the means for reducing the piston includes reducing the piston to less than an average wavelength of the polychromatic light.

28. The system of claim 20 wherein the means for reducing the piston includes reducing the piston to less than $\frac{1}{50}$th of an average wavelength of the polychromatic-unresolved light.

29. The system of claim 20 wherein the means for reducing the piston includes reducing the piston to less than $\frac{1}{100}$th of an average wavelength of the polychromatic-unresolved light.

30. The system of claim 20 wherein the polychromatic light includes wavelengths between 550 nanometers and 750 nanometers.

31. The system of claim 20 wherein:
- the means for reducing the piston is configured to affect intensity balancing of sidelobes of the fringe pattern, and
- approximately intensity-balanced sidelobes indicate approximate alignment of the first and second surfaces.

32. The system of claim 20 further comprising a mask configured to mask a portion of the grism.

33. The system of claim 32 further comprising an image of the mask imaged on a digitizing camera.

34. The system of claim 33 further comprising means for rotating the grism to orient grating lines on the grism approximately perpendicular to a spacing between the first and second surfaces.

35. The system of claim 34 wherein if an area of the mask imaged on the digital camera is approximately maximized, then the approximate maximization indicates the grating lines and the spacing are approximately perpendicular.

36. A computerized method for estimating relative piston between first and second surfaces illuminated by polychromatic light transmitted from an unresolved-light source such that light transmitted or reflected from the first surface is out of phase with light respectively transmitted or reflected from the second surface, and the out-of-phase light is passed through a grism that generates a fringe pattern in the far-field, the method comprising;
- Fourier transforming the fringe pattern to generate a two-dimensional (2D) power spectrum;
- generating the absolute value of the 2D power spectrum to form an absolute value representation; and
- generating an angular displacement between a central axis of the absolute value representation and a fixed axis, wherein the angular displacement is an indicator the relative piston of the first and second surfaces.

37. The computerized method of claim 36 further comprising:
- monitoring the angular displacement to determine whether the angular displacement exceeds the threshold; and
- adjusting the relative piston if the angular displacement is exceed the threshold.

38. The computerized method of claim 37 wherein monitoring is performed by computer code monitoring numerical values of the angular displacement.

* * * * *